Patented Oct. 30, 1934

1,978,954

UNITED STATES PATENT OFFICE 1,978,954

BOX TOE

Harold S. Miller, Quincy, Mass., assignor to Beckwith Manufacturing Company, Boston, Mass., a corporation of Massachusetts No Drawing. Application March 14, 1931, Serial No. 522,794

6 Claims. (Cl. 91—68)

This invention relates to shoe stiffeners and more particularly to box toes of such character that, when molded together with the upper about a last in the pulling over and lasting operation, they permanently set in the molded condition.

The object of the invention is to provide a box toe which is capable of being stretched and molded without wrinkles, which will not contract after setting, and which will possess fairly rigid resilient side walls around the toe end of the shoe and a more flexible roof or top portion underlying the middle portion of the toe cap. I utilize for this purpose a mixture of rubber and wax, to which, if desired, may be added an inert filler which is preferably light in weight, such as granulated or pulverized cork, balsa wood or the like, and preferably a layer comprising these components or ingredients is spread upon an open-mesh textile backing.

As an example of the composition which is placed upon the backing, I use 120 pounds by weight of rubber, which may be any suitable crude rubber, or reclaimed rubber, or a mixture of crude and reclaimed rubber; and 120 pounds of Montan wax. The rubber is plasticized and is then mixed with the Montan wax in any of the usual compounding, kneading or masticating machinery (e. g. a heated two-blade Werner and Pfleiderer mixer) employed in rubber factories until the Montan wax and the rubber are thoroughly mixed to provide a substantially homogeneous mixture. The procedure which is preferably followed is first to place the wax in a steam-jacketed mixer and to heat it to a temperature at which the wax melts, and then to add the plasticized rubber, which may be done gradually, until a physically homogeneous plastic mass results.

If a filler is to be employed, such as cork or other inert comminuted material, it is preferably mixed with the wax, prior to the addition of the rubber, in order that the individual particles may be coated with the wax and thoroughly distributed throughout the molten wax mass.

For 120 pounds of wax and 120 pounds of rubber I employ about 120 pounds of ground cork, which averages 20 cubic feet in bulk. Cork varies in weight, ordinarily from 4 to 8 pounds per cubic foot, and I have assumed in this example an average weight of 6 pounds. The proportion of cork to the rubber-wax mixture may be varied in accordance with the weight of the particular cork used.

After the mixture has been prepared, either with or without the comminuted filler, it is spread, while still soft and sticky, as by calender rolls, upon a textile fabric, which is preferably a light weight open-mesh woven fabric, and the sheet thus fabricated is allowed to cool and set. One or both faces of the fabric may be coated with the mixture. Usually, to prevent the rubber-wax mass from sticking to the applying roll, the latter is provided with a film of moisture by a wet pad.

The fabric requires no previous frictioning or kindred treatment, as the applied layer adheres tenaciously thereto, and the resulting fabricated sheet neither shrinks nor contracts or curls but remains flat.

Preferably, although not necessarily, sulphur forms one of the components of the completed product, and, in the example I have given, I use about 7 pounds of sulphur and about 20 pounds of zinc oxide, which may be added to the mixer at any appropriate time, usually after the rubber has been thoroughly mixed with the wax.

In cutting out the box-toe blanks from the sheeted material, they are cut on the bias, as it were, so that the warp and filling threads extend diagonally in reference to the median line of the blank, in accordance with the usual method practiced for many years in cutting out box toes having a fabric backing.

After the blanks are cut by dies or other suitable instrumentalities into the proper sizes and shapes, they are skived along the long edge which is to extend across the shoe, and, if desired, along the other edge or edges.

I have discovered a remarkable property of a box toe made as thus described, namely that, when softened by the application of heat, less than that injurious to leather, the box toe may be stretched crosswise or lengthwise to a remarkable extent, in excess of 30%, without cracking or injuring the composition layer or breaking the fabric. As a result of this property, the blank may be stretched around the end of the last so as to conform thereto without wrinkles or folds. Because of the large proportion of the thermoplastic,—Montan wax,—after the blank in its molded condition has cooled and set while on the last, it does not thereafter shrink or contract but retains its initially molded shape, and breakage is consequently eliminated.

A further advantage results from the fact that the upstanding side walls of the box, which follow in general the contour of the toe end of the sole, are relatively hard and stiff so as to withstand shocks, whereas what may be termed the roof portion of the box is flexible and resilient so that it will yield under pressure and spring back when the pressure is released.

Instead of the specific wax which I have referred to, I may employ any other suitable hard wax such as carnauba, candelilla and/or ceresine, or I may substitute such waxes or combinations of them for a portion of the Montan.

While the composition comprises the mixture of rubber and wax,—preferably with ground or granulated cork as described,—other ingredients may be added. For example, I find that the addition of short-fiber asbestos facilitates the skiving operation, and that a smooth skived surface results. This may be added to the mixture of which I have herein given a specific example, in about the proportion of 50 pounds of asbestos to 120 pounds of rubber. It is incorporated in the molten Montan wax, preferably before the rubber is added and while the organic filler is being mixed with the wax. Again I may add, if desired, rosin and/or asphalt to the ingredients previously mentioned, or I may substitute either or both for a portion of the wax. While I prefer to use cork as the inert filler because of its bulk and lightness, yet it is evident that other inert organic materials may be employed in lieu of the whole or a portion thereof, such as ground balsa wood or the sawdust of other suitable woods, shredded cotton wool, wood pulp, tan bark or the like. I prefer, however, a bulky, light weight material, such as granulated cork or balsa wood, as the chief filler, and on occasion use therewith shredded cotton or wool fibers or wood pulp.

In some instances, in preparing the composition prior to its being spread upon the fabric backing, I use the scrap and skivings left after cutting the box-toe blanks from the previously prepared or fabricated sheet and skiving the blanks. While the exact proportions of the several ingredients or components of the composition may be varied, yet they should be such that the resulting box toes possess the desirable characteristics which I mention herein.

The sheet of material, or the box toe blanks after being cut therefrom, may be thinly coated on the fabric face (or on both faces if desired) with glue to ensure adhesion of the blank to the leather upper or toe cap and the usual lining which forms a part of the completed shoe. A water-soluble glue or other hydrophillic colloidal substance may be employed, such as will be rendered adhesive by the moist heat which is supplied by the commercial "box toe steamers" which are in common use.

I have already referred to certain characteristics of a box toe embodying my invention, but in addition thereto I may note that the box toe is neither a "hard" box, so called, such as formed of a layer of felt impregnated with a thermoplastic stiffening agent and which is stiff and resilient when cold, nor a "soft" flexible box. On the contrary, my box toe is what may be termed a "semi-soft" box, in that it is not sufficiently flexible to bulge outwardly or upwardly in wear, and is not so distorted by the pressure of the wearer's toes as are soft box toes. The rubber component doubtless furnishes the desirable tensile strength and capacity to stretch, whereas the wax or other thermoplastic is in sufficient amount to enable the mass quickly to soften under the application of heat, and when set to resist any tendency of the rubber component to cause the contraction of the box after it has cooled and set in its molded condition. In fact, the box toe blanks do not lend themselves readily to the lasting and pulling over operations nor molding about the toe end of the last, unless they are softened or plasticized and made stretchable by heat. When molded and set, the roof portion of the box is, as I have said, relatively flexible and resilient, while the side walls are relatively stiff and resilient.

In some cases, the fabricated sheet is shipped to the shoe manufacturer to be cut by him into box-toe blanks, and in other cases the box-toe blanks are cut into proper sizes and shapes before shipment.

A curing or vulcanizing takes place, due to the inclusion of vulcanizing agents in the rubber-Montan-cork composition, this doubtless being hastened to some extent by the heating to which the fabricated material is subjected.

The cork-rubber-wax composition is water repellent, substantially impervious to moisture, and not affected by perspiration, and consequently preserves its uniformity when the shoe is warm. When a superficial coating of hydrophillic adhesive, which is normally hard and dry, is used on the fabric face, it takes up sufficient moisture, when exposed to moist heat, so that it may function in cementing the box toe to the leather vamp and lining of the upper.

While I have described my invention as embodied in a box toe, I mean of course to include other forms of shoe stiffeners, such as counter stiffeners. In some cases the fabricated sheet may be died out so as to fit within the inseam of a shoe and fill the space between the insole and the outsole.

What I claim is:—

1. As an article of manufacture, a resiliently stiff, composite sheet material especially serviceable in the form of shoe stiffener parts comprising a fabric backing carrying thereon an adherent layer of stiffening mixture consisting essentially of rubber and Montan wax in approximately equal proportions, whereby said sheet can be rendered soft and moldable by the application of heat less than that injurious to leather and then be set quickly in its molded shape at room temperature.

2. As an article of manufacture, a resiliently stiff, composite sheet material especially serviceable in the form of shoe stiffener parts comprising a fabric backing carrying thereon an adherent layer of stiffening mixture consisting essentially of rubber and Montan wax in approximately equal proportions and a bulky filler, whereby said sheet can be rendered soft and moldable by the application of heat less than that injurious to leather and then be set quickly in its molded shape at room temperature.

3. As an article of manufacture, a resiliently stiff, composite sheet material especially serviceable in the form of shoe stiffener parts comprising a fabric backing carrying thereon an adherent layer of stiffening mixture consisting essentially of rubber and Montan wax in approximately equal proportions and ground cork, whereby said sheet can be rendered soft and moldable by the application of heat less than that injurious to leather and then be set quickly in its molded shape at room temperature.

4. As an article of manufacture, a resiliently stiff, composite sheet material especially serviceable in the form of shoe stiffener parts comprising a fabric backing carrying thereon an adherent layer of stiffening mixture consisting essentially of rubber and wax in approximately equal proportions, said wax being selected from a class of hard waxes consisting of Montan, carnauba, candelilla, and ceresine, whereby said sheet can be rendered soft and moldable by the application of heat less than that injurious to leather and then be set quickly in its molded shape at room temperature.

5. As an article of manufacture, a resiliently stiff, composite sheet material especially serviceable in the form of shoe stiffener parts comprising a fabric backing carrying thereon an adherent layer of stiffening mixture consisting essentially of rubber and wax in approximately equal proportions and a bulky filler, said wax being selected from a class of hard waxes consisting of Montan, carnauba, candelilla, and ceresine, whereby said sheet can be rendered soft and moldable by the application of heat less than that injurious to leather and then be set quickly in its molded shape at room temperature.

6. As an article of manufacture, a resiliently stiff, composite sheet material especially serviceable in the form of shoe stiffener parts comprising a fabric backing carrying thereon an adherent layer of stiffening mixture consisting essentially of rubber and wax in approximately equal proportions and ground cork, said wax being selected from a class of hard waxes consisting of Montan, carnauba, candelilla, and ceresine, whereby said sheet can be rendered soft and moldable by the application of heat less than that injurious to leather and then be set quickly in its molded shape at room temperature.

HAROLD S. MILLER.